(12) United States Patent
Somashekar et al.

(10) Patent No.: US 12,538,147 B2
(45) Date of Patent: Jan. 27, 2026

(54) DETERMINING A ROOT CAUSE OF A FAILED INTERACTION BETWEEN A MOBILE DEVICE AND A WIRELESS TELECOMMUNICATION NETWORK

(71) Applicant: T-Mobile USA, Inc., Bellevue, WA (US)

(72) Inventors: Sharath Somashekar, Overland Park, KS (US); Rashmi Kumar, Herndon, VA (US); Jennifer Feria Reyes, Bothell, WA (US); Sunil Kumar Gopal Reddy, Olathe, KS (US)

(73) Assignee: T-Mobile USA, Inc., Bellevue, WA (US)

( * ) Notice: Subject to any disclaimer, the term of this patent is extended or adjusted under 35 U.S.C. 154(b) by 433 days.

(21) Appl. No.: 18/323,365

(22) Filed: May 24, 2023

(65) Prior Publication Data

US 2024/0397349 A1    Nov. 28, 2024

(51) Int. Cl.
*H04L 12/00* (2006.01)
*H04L 41/0631* (2022.01)
*H04L 41/0816* (2022.01)
*H04W 24/04* (2009.01)

(52) U.S. Cl.
CPC ......... *H04W 24/04* (2013.01); *H04L 41/0645* (2013.01); *H04L 41/0816* (2013.01)

(58) Field of Classification Search
CPC ..... H04W 24/10; H04W 24/04; H04W 24/08; H04L 41/064; H04L 41/0816; H04L 41/0645

USPC ........................................................ 370/216
See application file for complete search history.

(56) References Cited

U.S. PATENT DOCUMENTS

| | | | |
|---|---|---|---|
| 7,430,420 | B2 | 9/2008 | Derakhshan et al. |
| 7,835,319 | B2 | 11/2010 | Sugar |
| 8,463,285 | B2 | 6/2013 | Macnaughtan et al. |
| 8,976,677 | B2 | 3/2015 | Novak et al. |
| 9,026,125 | B2 | 5/2015 | Dhanda et al. |
| 9,674,840 | B1 | 6/2017 | Chirala et al. |
| 9,867,070 | B2 | 1/2018 | Luo et al. |
| 9,942,093 | B2 * | 4/2018 | Ong .................. H04W 88/06 |
| 9,942,896 | B2 | 4/2018 | Chandwani et al. |
| 10,517,003 | B2 | 12/2019 | Bhardwaj et al. |

(Continued)

FOREIGN PATENT DOCUMENTS

| | | |
|---|---|---|
| CN | 108605283 A | 9/2018 |
| CN | 111095975 A | 5/2020 |

(Continued)

*Primary Examiner* — Frantz Coby
(74) *Attorney, Agent, or Firm* — Perkins Coie LLP

(57) ABSTRACT

The system obtains data associated with a failed interaction between a UE and a wireless telecommunication network and makes a series of determinations based on the data, including missing connection summary parameters, missing signaling information, missing component carrier parameters, whether the node in the network is properly configured, whether an RF measurement matches an expected RF measurement, and whether a condition associated with a channel used in the failed interaction is satisfactory. The system provides the results of the determinations to the root cause analytics engine, which in turn, based on the results, determines a root cause associated with the failed interaction.

20 Claims, 8 Drawing Sheets

(56) References Cited

U.S. PATENT DOCUMENTS

| | | | |
|---|---|---|---|
| 11,039,304 | B2 | 6/2021 | Ponnamreddy et al. |
| 11,276,308 | B2 | 3/2022 | Bakhishev et al. |
| 11,831,499 | B2* | 11/2023 | Ong .................... H04L 41/0816 |
| 12,057,994 | B1* | 8/2024 | Gonzalez ............ H04L 41/0654 |
| 12,363,564 | B2* | 7/2025 | Jayaram ................ H04W 24/10 |
| 2002/0183059 | A1 | 12/2002 | Noreen et al. |
| 2004/0029545 | A1 | 2/2004 | Anderson et al. |
| 2004/0203727 | A1 | 10/2004 | Abiri et al. |
| 2012/0220240 | A1 | 8/2012 | Rothschild et al. |
| 2017/0230851 | A1* | 8/2017 | Ko .......................... H04M 3/36 |
| 2017/0353991 | A1* | 12/2017 | Tapia ...................... H04L 43/08 |
| 2018/0070327 | A1 | 3/2018 | Qureshi et al. |
| 2018/0254942 | A1* | 9/2018 | Tocker .................. H04L 41/064 |
| 2020/0259701 | A1* | 8/2020 | Povoa ................ G05B 23/0281 |
| 2021/0176143 | A1* | 6/2021 | Dade ...................... H04L 43/12 |
| 2022/0224613 | A1* | 7/2022 | Chakraborty ....... H04W 36/305 |
| 2024/0129760 | A1* | 4/2024 | Jayaram ................ H04W 24/04 |

FOREIGN PATENT DOCUMENTS

| | | | |
|---|---|---|---|
| CN | 111279734 | A | 6/2020 |
| CN | 111602066 | A | 8/2020 |
| CN | 108293215 | B | 6/2021 |
| CN | 108271191 | B | 11/2021 |
| CN | 108886828 | B | 11/2021 |
| CN | 107534862 | B | 3/2022 |
| CN | 112806065 | B | 1/2023 |
| EP | 2769481 | A1 | 8/2014 |
| EP | 2946477 | A1 | 11/2015 |
| EP | 2620028 | B1 | 4/2020 |
| EP | 3381224 | B1 | 4/2020 |
| EP | 3659361 | A1 | 6/2020 |
| EP | 3740297 | B1 | 7/2022 |
| JP | 5519872 | B2 | 4/2014 |
| JP | 2015523014 | A | 8/2015 |
| JP | 2016507181 | A | 3/2016 |
| JP | 2017520975 | A | 7/2017 |
| JP | 6352438 | B2 | 6/2018 |
| JP | 2019500777 | A | 1/2019 |
| JP | 2020508596 | A | 3/2020 |
| JP | 6914888 | B2 | 7/2021 |
| JP | 7071449 | B2 | 5/2022 |
| KR | 20050050640 | A | 5/2005 |
| KR | 20060086812 | A | 8/2006 |
| KR | 101197510 | B1 | 11/2012 |
| KR | 20150107808 | A | 9/2015 |
| KR | 20170008230 | A | 1/2017 |
| KR | 20180086422 | A | 7/2018 |
| KR | 101895814 | B1 | 9/2018 |
| KR | 102243344 | B1 | 4/2021 |
| KR | 20210109543 | A | 9/2021 |
| KR | 102429189 | B1 | 8/2022 |
| WO | 2004016033 | A2 | 2/2004 |
| WO | 2011014844 | A2 | 2/2011 |
| WO | 2012037637 | A1 | 3/2012 |
| WO | 2013058795 | A1 | 4/2013 |
| WO | 2014113484 | A1 | 7/2014 |
| WO | 2015069601 | A1 | 5/2015 |
| WO | 2015171246 | A1 | 11/2015 |
| WO | 2016111756 | A1 | 7/2016 |
| WO | 2016168155 | A1 | 10/2016 |
| WO | 2017003621 | A1 | 1/2017 |
| WO | 2017027118 | A1 | 2/2017 |
| WO | 2017091315 | A1 | 6/2017 |
| WO | 2017190815 | A1 | 11/2017 |
| WO | 2018125533 | A1 | 7/2018 |
| WO | 2018166638 | A1 | 9/2018 |
| WO | 2019020178 | A1 | 1/2019 |
| WO | 2019139669 | A1 | 7/2019 |
| WO | 2020082633 | A1 | 4/2020 |
| WO | 2020146365 | A1 | 7/2020 |
| WO | 2021001480 | A1 | 1/2021 |
| WO | 2021049993 | A1 | 3/2021 |
| WO | 2021243374 | A1 | 12/2021 |
| WO | 2022152643 | A1 | 7/2022 |

* cited by examiner

DETERMINING A ROOT CAUSE OF A FAILED INTERACTION BETWEEN A MOBILE DEVICE AND A WIRELESS TELECOMMUNICATION NETWORK

BACKGROUND

Wireless telecommunication networks are complex systems with many components. The service provided by the wireless telecommunication networks can occasionally degrade or fail. Troubleshooting to find the root cause of the failures demands long hours of analyzing correlating information, downloading large and extensive log files from several elements and inspecting numerous node related configuration parameters. Delays in fixing issues can cause further service degradation and hinder rollout of new features.

BRIEF DESCRIPTION OF THE DRAWINGS

Detailed descriptions of implementations of the present invention will be described and explained through the use of the accompanying drawings.

Figure 1:
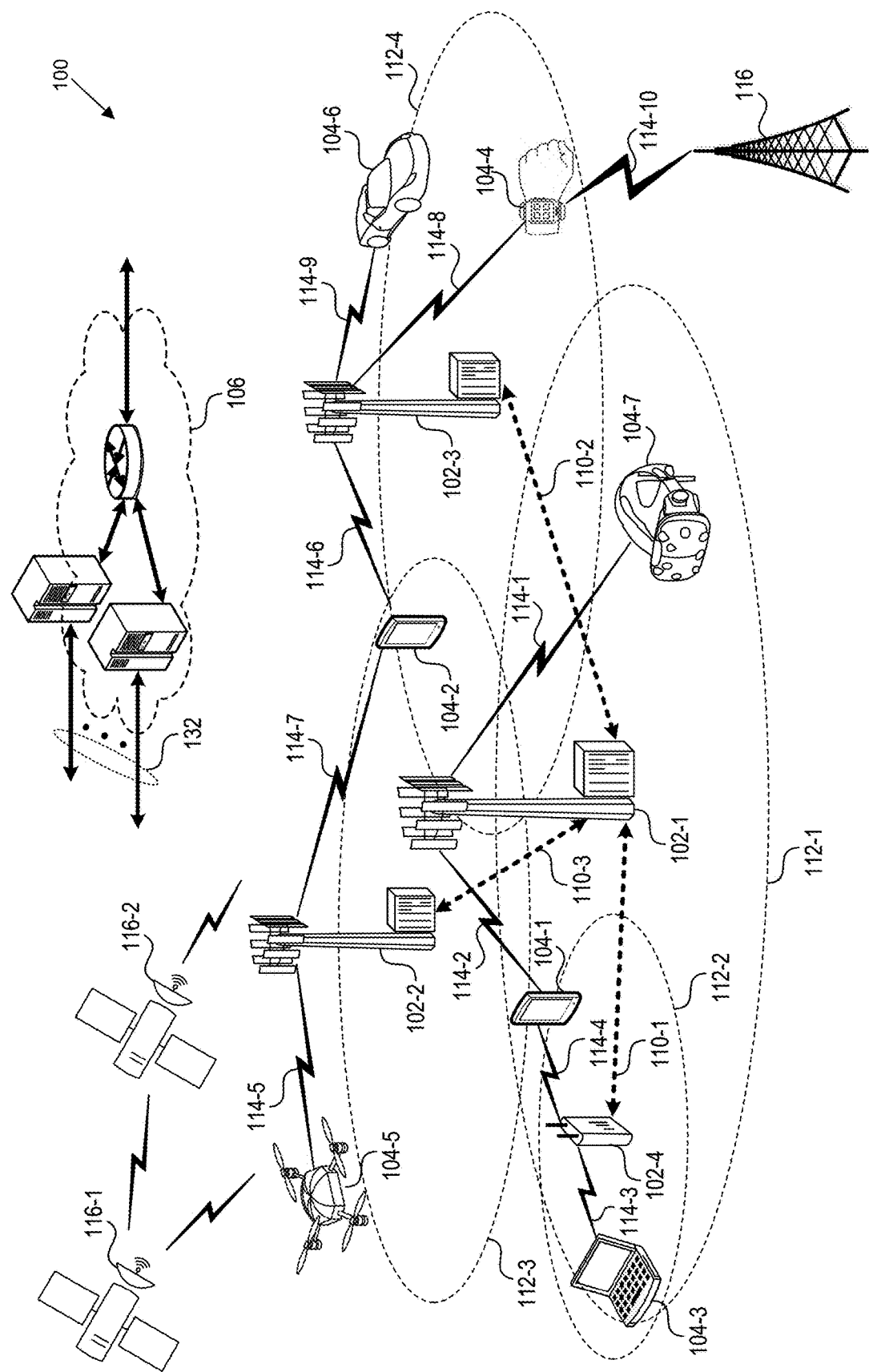
FIG. 1 is a block diagram that illustrates a wireless telecommunication network in which aspects of the disclosed technology are incorporated.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Disclosed here is a system and method to determine a root cause of a failed interaction between a mobile device and a wireless telecommunication network. The system obtains data associated with the failed interaction between the mobile device and the wireless telecommunication network. The data can be stored in a log, or directly obtained from the wireless telecommunication network elements, such as nodes in the wireless telecommunication network and/or a testing system associated with the wireless telecommunication network. The system determines whether a connection summary parameter is missing from the data associated with the failed interaction. Upon determining that the connection summary parameter is missing, the system provides the connection summary parameter to an RCA. The RCA can be a rules-based system or can be a machine learning model trained using supervised learning.

Upon determining whether the connection summary parameter among the multiple connection summary parameters is missing, the system determines whether signaling information is missing from the data associated with the failed interaction. Upon determining that the connection summary parameter is missing and that the signaling information is missing, the system determines that the test failed as opposed to there being a problem with the mobile device or the wireless telecommunication network. Upon determining that the signaling information is missing, the system provides the signaling information to the RCA.

Further, upon determining whether the signaling information is missing, the system determines whether a parameter is missing from the data associated with the failed interaction. Upon determining that the parameter is missing, the system provides the parameter to the RCA. Upon determining whether the parameter is missing, the system determines whether the node associated with the wireless telecommunication network is configured properly. Upon determining that the node associated with the wireless telecommunication network is not configured properly, the system provides a configuration of the node to the RCA.

Upon determining whether the node is configured properly, the system determines whether a radio frequency (RF) measurement matches an expected RF measurement. Upon determining that the RF measurement does not match the expected RF measurement, the system provides the RF measurement to the RCA. Upon determining whether the RF measurement matches the expected RF measurement, the system determines whether a condition associated with a channel used in the failed interaction is satisfactory. Upon determining that the condition associated with the channel used in the failed interaction is not satisfactory, the system provides the condition to the RCA. Based on the provided information, the system causes the RCA to indicate a root cause associated with the failed interaction.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, internet protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device (e.g., wireless devices 104) can be referred to as a user equipment (UE), a customer premises equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites, such as satellites 116-1 and 116-2, to deliver services anywhere and anytime and provide coverage in areas that are unreachable by any conventional Terrestrial Network (TN). A 6G implementation of the network 100 can support terahertz (THz) communications. This can support wireless applications that demand ultra-high quality of service (QOS) requirements and multi-terabits-per-second data transmission in the 6G and beyond era, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and core architecture to achieve Control and User Plane Separation (CUPS) and achieve extremely low user plane latency. In yet another example of 6G, the network 100 can implement a converged Wi-Fi and core architecture to increase and improve indoor coverage.

5G Core Network Functions

Figure 2:
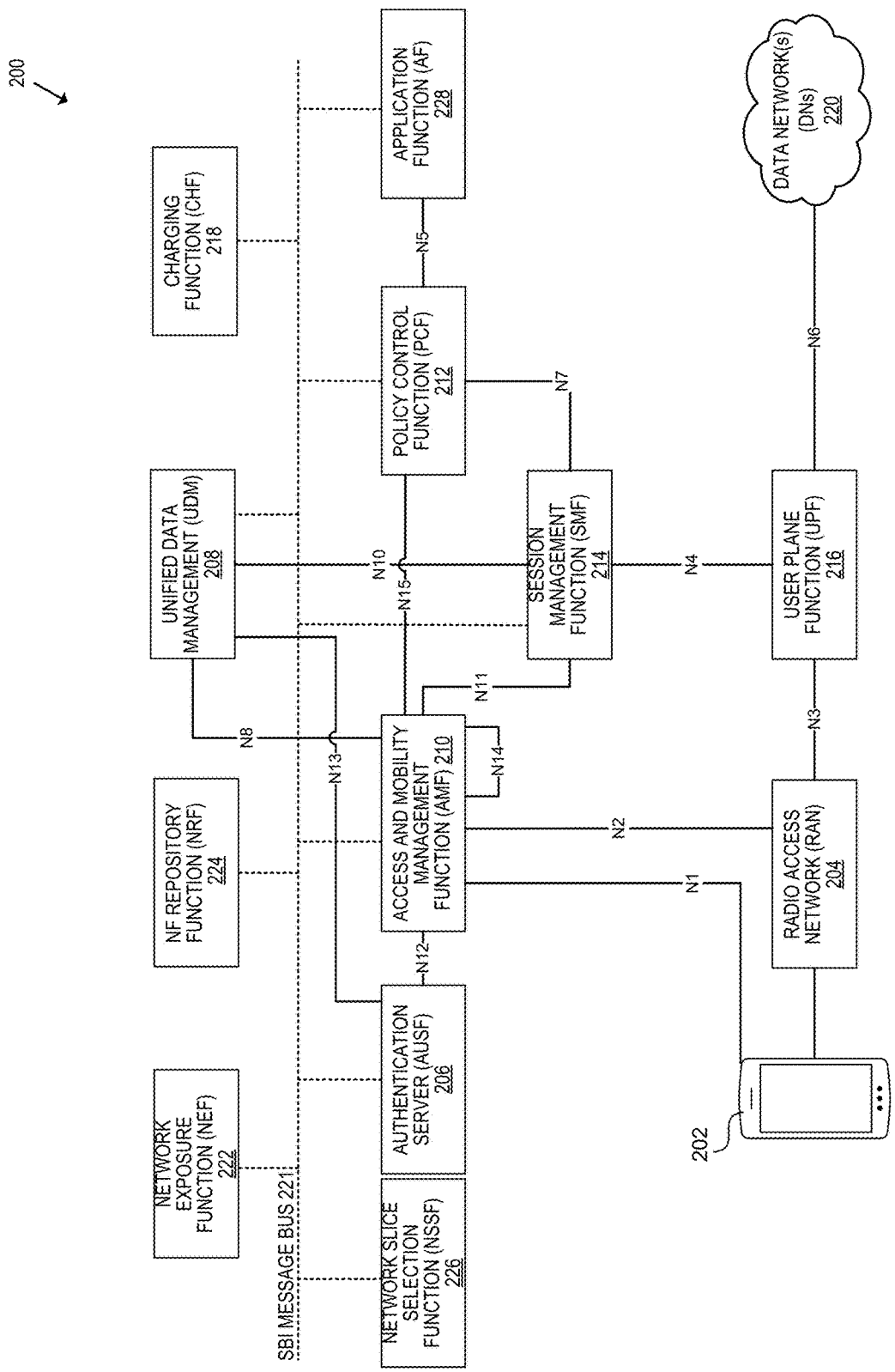
FIG. 2 is a block diagram that illustrates an architecture including 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, an NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, and service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS) and can provide authentication credentials while being employed by the AMF 210 and SMF 214 to retrieve subscriber data and context.

The PCF 212 can connect with one or more Application Functions (AFs) 228. The PCF 212 supports a unified policy framework within the 5G infrastructure for governing network behavior. The PCF 212 accesses the subscription information required to make policy decisions from the UDM 208 and then provides the appropriate policy rules to the control plane functions so that they can enforce them. The SCP (not shown) provides a highly distributed multi-access edge compute cloud environment and a single point of entry for a cluster of NFs once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224 use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework that, along with the more typical QoS and charging rules, includes network slice selection, which is regulated by the NSSF 226.

Figure 3:
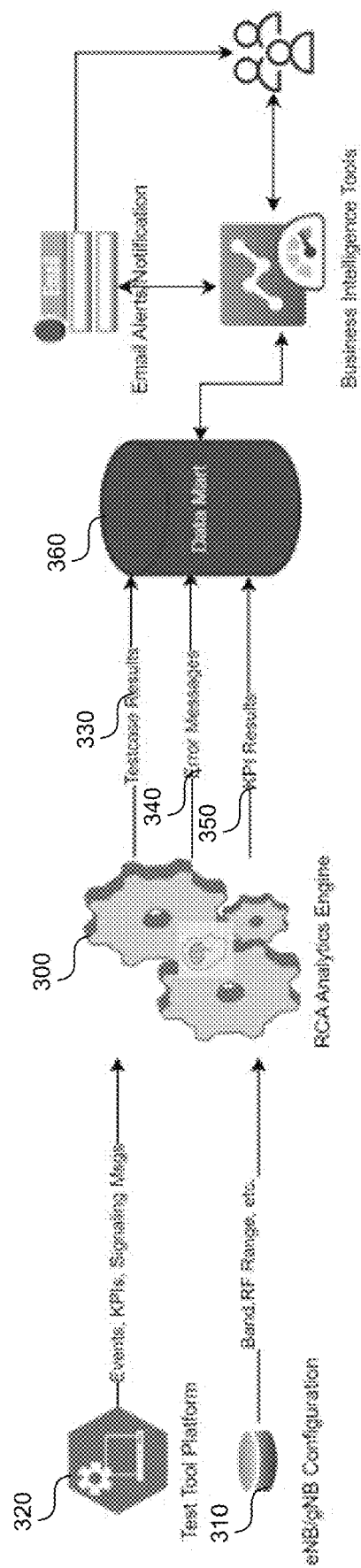
FIG. 3 shows an overview of the system to determine a root cause of a failed interaction between a user equipment (UE) and the network.

Determining a Root Cause of a Failed Interaction Between a Mobile Device and a Wireless Telecommunication Network FIG. 3 shows an overview of the system to determine a root cause of a failed interaction between a UE and the network 100 in FIG. 1. The RCA 300 takes in as input various information from the network 100 such as the eNodeB, gNodeB configuration 310, logs 320 from the network, and/or direct measurements from the network 100 components. The RCA 300 analyzes whether there has been a failure in an interaction between the UE and the network 100, and stores the analysis results 330, the error messages found 340, and the key performance indicators (KPI) results 350 in a database 360 associated with the network 100.

If the RCA 300 determines that there has been a failure, the RCA 300 can provide diagnostics by, e.g., determining the root cause analysis of the failure and storing the results in the database 360 as well. For example, the RCA 300 can be an expert system, in other words, can be rule-based. The RCA 300 can have a built-in knowledge base used to evaluate each test case to determine the root cause. The RCA 300 can categorize the failure by interaction phase, e.g., call phase, where the failure occurred, the system within the network 100 that caused the failure, and the recorded error messages. The RCA 300 can perform evaluation using rules based on call flows defined by subject matter experts in 5G, and LTE call flow procedures.

The RCA 300 can also be a machine learning (ML) model trained using supervised learning. The RCA can include functions capable of automatically classifying test case results based on previously labeled data from, for example, the rule-based RCA. The ML based RCA 300 can be a Bayesian network, a decision tree, or a support vector machine. The RCA 300 can be deployed to an on-premises server or a cloud platform and can be scheduled to run on regular intervals or ad hoc.

The RCA 300 can query post-process data stored on a central storage and can perform extraction transformation (including evaluation) to provide root cause analysis. The RCA 300 can identify the root cause of failure. The root cause of failure can include network acquisition, IP multimedia system core related failure, packet data core failures, UE related failures, tests setup isolation, UE isolation, and/or radio network isolation, etc.

The RCA 300 can further analyze the KPIs from the database 360 and check whether the KPIs are meeting targets of the design requirements stored in the database 360. The RCA 300 can also acquire the desired node, e.g., eNodeB and/or gNodeB, configuration from a secondary database. The RCA 300 can use the test case name to determine the test case configuration for number of component carriers, bands, bandwidth, technology, scenario, traffic direction, and/or traffic type. The RCA 300 can further validate the test case configuration against the measured bands, bandwidth, physical resource blocks (PRBs), modulation and coding scheme (MCS), channel quality indicator (CQI), block error rate (BLER), and RF conditions of each of the component carriers and carrier aggregation scenarios. The RF conditions can include Reference Signal Received Power (RSRP), Reference Signal Received Quality (RSRQ), and Signal Interference plus Noise Ratio (SINR).

MCS defines how many useful bits can be transmitted per resource element (RE). MCS depends on radio link quality. The better the quality, the higher the MCS and the greater the amount of useful data that can be transmitted. The CQI is expressed as a data rate that a UE can support under the actual radio conditions. SINR is used for calculating CQI. In LTE & NR, CQI has only 15 codes. The MCS parameter is assigned based on the CQI value. BLER closely reflects on the RF channel conditions and the level of interference. Block error rate (BLER)—the ratio of the number of transport blocks received in error to the total number of blocks transmitted over a certain number of frames. For a given modulation depth, the cleaner the radio channel or higher the SNR, the less likely the transport block being received in error. That indicates a lower BLER.

RSRP is a measure of the received power level in the network 100. The average power is a measure of the power received from a single reference signal. The SINR value is measured in decibels (dB). The higher the value, the better the signal quality. At SINR values below 0, the connection speed will be very low, since this means that there is more noise in the received signal than the useful part, and the probability of losing a connection also exists.

In test setup isolation phase, the RCA 300 can determine that the test scenarios were executed in the expected environment by comparing the measured versus expected node configurations, including bands, bandwidths, and physical cell identifier (PCI) provided in a second database. The RCA 300 can provide the respective errors if mismatch of configuration is found.

In UE isolation phase, the RCA 300 can evaluate against measured MCS, CQI, and/or RF conditions for each of the component carriers and determine whether the performance is degraded from the UE. The RCA 300 can provide the associated errors.

In radio network isolation phase, the RCA 300 can evaluate against measured PRBs, BLER, and RF conditions for each of the component carriers, and determine whether the performance is degraded from the radio network component such as eNodeB, gNodeB, and/or Open Radio Access Network (ORAN). The RCA 300 can provide the respective errors.

The RCA 300 can use any combination of the failure phases to determine whether the issue lies with the radio network, core network, or UE, and can provide root cause analysis. For any errors that cannot be categorized in the above explained failure phases, the RCA 300 can provide the errors again for human intervention and further analysis.

Figure 4:
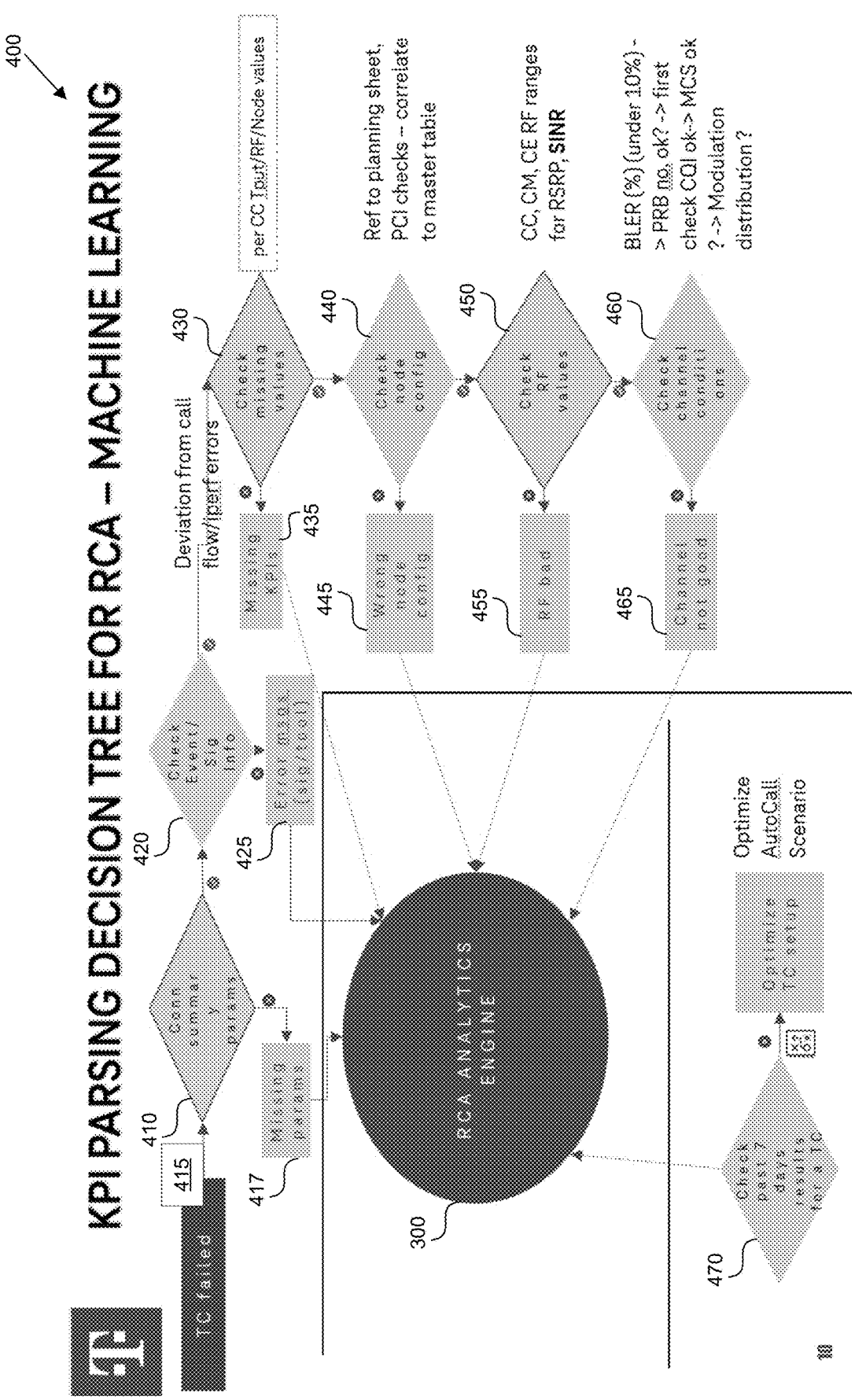
FIG. 4 shows inputs to the root cause analytics engine (RCA).

FIG. 4 shows inputs to the RCA 300. In step 410, the system 400 can receive data 415 associated with the failed interaction between the mobile device and the wireless telecommunication network. The data can be from a test or from a real-world interaction. The interaction can be a voice, short message service (SMS), throughput, access, or mobility interaction. Mobility interaction can test handover of the interaction between various towers or various networks 100. The system 400 can determine whether the data 415 includes connection summary parameters. There can be over 300 connection summary parameters, but if at least one of them is missing, the system 400 can indicate the missing parameters 417 to the RCA 300.

In step 420, the system 400 can check whether the data 415 includes event/signaling information. If there are error messages in the data 415 where event/signaling information needs to be, the system 400 can send the error messages 425 to the RCA 300. The RCA 300 can analyze the missing parameters 417 and the error messages 425 to determine a root cause of the failed interaction. For example, if one or more of the connection summary parameters is missing, and the event/signaling information is missing, the RCA 300 can determine that the test did not run at all. If one or more of the connection summary parameters is missing, and the event/signaling information is present, the system 400 proceeds to further check additional root causes of failure.

In step 430, the system 400 can determine whether there are missing values in the data 415. For example, the system 400 can test throughput of component carriers. The system 400 can check that all the parameters out of seven or eight parameters are present in every channel out of four channels. The seven or eight parameters can include throughput per channel, or a combination of throughputs from various RF, number of PRBs assigned to a channel, SLOT Utilization, etc. The system 400 can check whether there are any missing parameters in any of the four channels. If, for example, three channels have all the values, but the fourth channel is missing at least some of the seven parameter values, the system 400 can determine that there is a configuration issue on an eNodeB or a gNodeB, or there could be an issue with a UE. If there are any missing parameters, the system 400 can send an indication of the missing parameters 435 to the RCA 300.

In step 440, the system 400 can check eNodeB or gNodeB configuration. For example, if the system 400 is testing four channels, the system can check that the four channels belong to the eNodeB or gNodeB that the system 400 wanted to test, as opposed to some other node. If the channels under test do not belong to the intended node, the system 400 can send an error message 445 to the RCA 300.

In step 450, the system 400 can check RF values for RSRP and/or SINR to determine user positions at various locations inside a cell such as cell center, cell middle, and cell edge. For example, the system 400 can obtain expected RF values, e.g., ranges, for RSRP and SINR at the various allocations cell center, cell middle, and cell edge. The RSRP and SINR values at cell center are higher than RSRP and SINR values at cell middle, which in turn are higher than RSRP and SINR values at cell edge. The system 400 can obtain the location of the UE and the RSRP and SINR measurements from the data 415. Based on the location of the UE, the system 400 can compare the RSRP and SINR measurements from the data 415 to the appropriate expected RSRP and SINR values. If the measurements from the test data underperform the expected RSRP and SINR values, the system 400 can send the underperforming RSRP and/or SINR values 455 to the RCA 300.

In step 460, the system 400 can check channel conditions. The system 400 can check the BLER for the channel, such as by checking whether the BLER is under a predetermined threshold, e.g., 10%. If the BLER is above the predetermined threshold, the system 400 can send the data 465 including the BLER to the RCA 300. The system 400 can check whether additional parameters including PRB, CQI, MCS, and modulation distribution are satisfactory. PRB values expected are mapped by Bandwidths (eg., 50 PRBs for 10 MHz, 100 PRBs for 20 MHz, etc), CQI ranges vary between 1-15, and modulation ranges are typically set between 1-30. MCS mapping is a function of Modulation ranges (e.g., 1-7: QPSK, 8-15: 16 QAM, 16-22: 64 QAM, 22-28: 256 QAM). If any of the additional parameters are not satisfactory, the system 400 can include the unsatisfactory parameters in the data 465 sent to the RCA 300.

The RCA 300 can determine the root cause based on the inputs 417, 425, 435, 445, 455, 465. The system 400 can perform the steps 410, 420, 430, 440, 450, 460 in order, as shown in FIG. 4 because such order of steps is optimal. However, the steps can also be rearranged.

The RCA 300 can also obtain historical data 470 from the database 360 in FIG. 3, where the historical data 470 shows performance of the network 100 in FIG. 1 for a particular interaction such as a voice, (SMS), throughput, access, or mobility interaction. The historical data 470 can include a predetermined period such as the past seven days. For example, if the interaction includes throughput, the historical data 470 can indicate various throughput amounts in the last seven days such as 75 megabits per second, 70 megabits per second, 50 megabits per second, etc. The system 400 can determine an acceptable range of throughputs such as 70 megabits per second through 80 megabits per second. The system 400 can detect a deviation from the acceptable range in the historical data 470, such as a throughput of 50 megabits per second. When the deviation is detected, the system 400 can generate a notification and can identify changes in the network 100 which occurred prior to the deviation in throughput.

Figure 5:
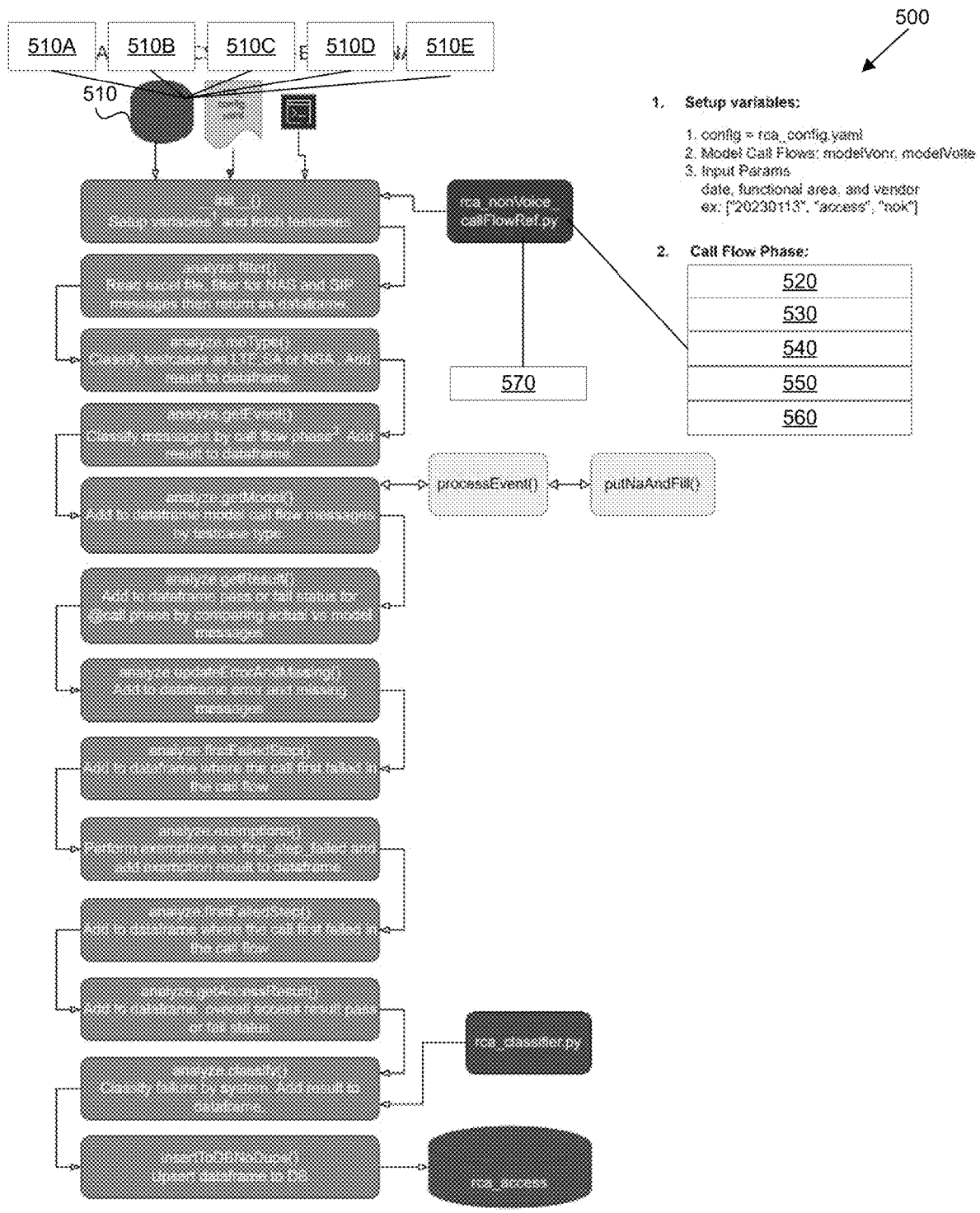
FIG. 5 shows a system to detect errors in data associated with an interaction.

FIG. 5 shows a system to detect errors in data associated with an interaction. The data 510 can include information associated with the failed interaction such as the band associated with the interaction, the generation of technology, e.g., 3G, 4G, 5G, etc. The system 500, based on the data 510, can determine the type of interaction such as voice 510A, SMS 510B, throughput 510C, access 510D, and mobility 510E.

Each type of interaction 510A-510E goes through one or more of the interaction phases, e.g., call phases 520, 530, 540, 550, 560, where the call phases 520, 530, 540, 550, 560 differ based on the type of interaction 510A-510E. The call phases 520, 530, 540, 550, 560 can correspond to 5G registration, default power distribution unit (PDU) establishment, evolved packet system (EPS) attach, default IP multimedia subsystem (IMS) bearer setup, and session initiation protocol (SIP) registration, respectively.

For example, the system 500 can determine that the interaction is throughput 510C, in which case only the call phases 520, 530, and 540 are relevant. Similarly, if the system determines that the interaction is voice 510A, then all the call phases 520, 530, 540, 550, and 560 are relevant.

Once the system 500 determines the relevant call phases 520-560, the system can retrieve one or more templates 570 indicating information associated with a working interaction. The system 500 can compare the templates 570 and the data 510 to determine the differences, such as errors contained in the data 510 that are not in the template 570 or information that is in the template 570 but not in the data 510. Based on the differences between the template 570 and the data 510, the system 500 can detect errors in the data 510.

Figure 6A:
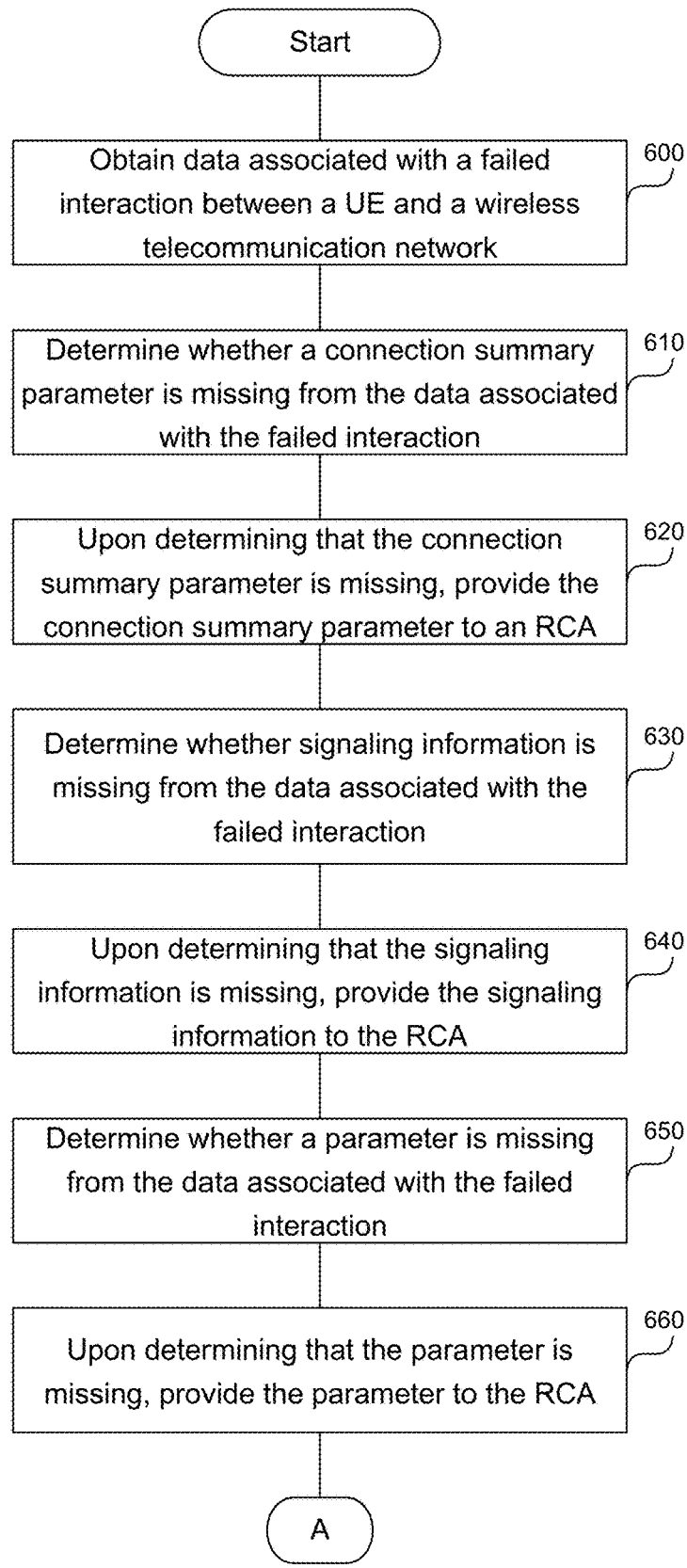
FIGS. 6A-6B are a flowchart of a method to determine a root cause of a failed interaction between a mobile device and a wireless telecommunication network.
Figure 6B:
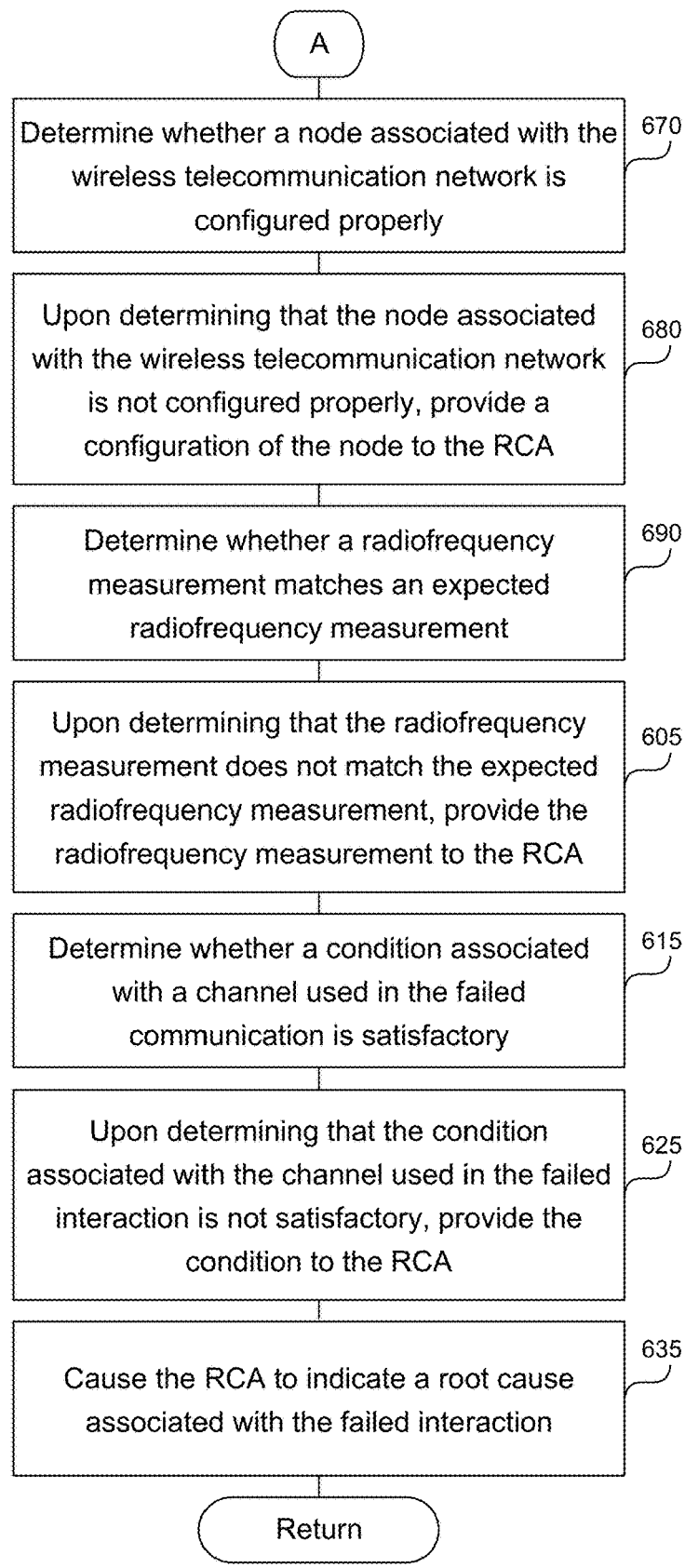

FIGS. 6A-6B are a flowchart of a method to determine a root cause of a failed interaction between a mobile device and a wireless telecommunication network. In step 600, a hardware or software processor executing instructions described in this application can obtain data associated with a failed interaction between a UE and a wireless telecommunication network. The data can be obtained from a log, from elements of network 100 in FIG. 1, e.g. a testing system.

In step 610, the processor can determine whether a connection summary parameter is missing from the data associated with the failed interaction. For example, connection summary parameter can include Master Information Block (MIB) info such as E-UTRA Absolute Radio Frequency Channel Number, PCI and band information. E-UTRA is a radio access network (RAN).

In step 620, upon determining that the connection summary parameter among the multiple connection summary parameters is missing, the processor can provide the connection summary parameter to an RCA. The RCA can be a rules-based expert system or can be a machine learning model trained using supervised learning.

In step 630, upon determining whether, or that, the connection summary parameter among multiple connection summary parameters is missing, the processor can determine whether signaling information is missing from the data associated with the failed interaction. Upon determining that the connection summary parameter is missing and the signaling information is missing, the processor can determine that the test which was supposed to generate the data failed.

In step 640, upon determining that the signaling information is missing, the processor can provide the signaling information to the RCA.

In step 650, upon determining whether, or that, the signaling information is missing, the processor can determine whether a parameter is missing from the data associated with the failed interaction. The missing parameter can indicate that a component carrier, in carrier aggregation, is not functioning properly.

In step 660, upon determining that the parameter is missing, the processor can provide the parameter to the RCA.

In step 670, upon determining whether, or that, the parameter is missing, the processor can determine whether a node associated with the wireless telecommunication network is configured properly. The node can include an eNodeB or a gNodeB.

In step 680, upon determining that the node associated with the wireless telecommunication network is not configured properly, the processor can provide a configuration of the node to the RCA.

In step 690, upon determining whether, or that, the node is configured properly, the processor can determine whether an RF measurement matches an expected RF measurement.

In step 605, upon determining that the RF measurement does not match the expected RF measurement, the processor can provide the RF measurement to the RCA.

In step 615, upon determining whether, or that, the RF measurement matches the expected RF measurement, the processor can determine whether a condition associated with a channel used in the failed interaction is satisfactory.

In step 625, upon determining that the condition associated with the channel used in the failed interaction is not satisfactory, the processor can provide the condition to the RCA.

In step 635, the processor can cause the RCA to indicate a root cause associated with the failed interaction. As explained in this application, the root cause of failure can include network acquisition, IP multimedia system core related failure, packet data core failures, UE related failures, tests setup isolation, UE isolation, radio network isolation, etc.

The processor can determine a type of the failed interaction based on multiple types including voice, SMS, throughput, access, and mobility. Access tests whether the UE can reach the network, while mobility tests handover of the connection to a different cell tower, or a different network. The processor can obtain multiple phases of an interaction, where the multiple phases include a 5G registration, a default power distribution unit establishment, an evolved packet system attach, a default IP multimedia subsystem bearer setup, and a session initiation protocol registration. Based on the type of the failed interaction, the processor can determine a subset of the multiple phases relevant to the failed interaction. Based on the subset of the multiple phases relevant to the failed interaction, the processor can obtain a template representing a successful phase among the subset of the multiple phases. Based on the successful phase and the data associated with the failed interaction, the processor can determine an indication of the root cause of the failed interaction.

The processor can obtain data associated with a successful interaction between the UE and the wireless telecommunication network. The processor can store the data associated with the successful interaction in a database. The processor can retrieve data associated with multiple successful interactions from the database over a predetermined period of time, such as the last seven days. The processor can determine whether the data associated with the multiple successful interactions indicates a deterioration in interaction between the UE and the wireless telecommunication network. For example, the processor can determine that the throughput of the connection dropped from 75 megabits per second to 50 megabits per second. Upon determining that there is the deterioration, the processor can employ the RCA to determine a cause of the deterioration. For example, the RCA can analyze the data stored in the database using the steps described in this application.

The processor can obtain the data associated with the failed interaction between the UE and the wireless telecommunication network, where the data associated with the failed interaction includes multiple component carriers. The processor can determine whether multiple parameters are present in a component carrier among the multiple component carriers. Upon determining that a parameter among the multiple parameters is not present in the component carrier among the multiple component carriers, the processor can send an indication to the RCA that the parameter is missing.

The processor can obtain the data associated with the failed interaction between the UE and the wireless telecommunication network, where the data associated with the failed interaction includes multiple RF measurements associated with multiple component carriers. The multiple RF measurements can include an RF measurement at cell center, an RF measurement at cell middle, and an RF measurement at cell edge for each component carrier. RF measurements can include RSRP and/or SINR. The processor can determine whether an RF measurement among the multiple RF measurements matches the expected RF measurement. Upon determining that the RF measurement among the multiple RF measurements does not match the expected RF measurement, the processor can provide the RF measurement to the RCA.

The processor can obtain the data associated with the failed interaction between the UE and the wireless telecommunication network, where the data associated with the failed interaction includes a BLER, a PRB, a CQI, an MCS, and a modulation distribution. The processor can determine whether multiple conditions associated with a channel used in the failed interaction are satisfied by performing the following steps. The processor can determine whether the BLER is satisfactory by determining whether the block error rate is under a first predetermined threshold, such as 10%. The processor can determine whether the PRB, CQI, MCS, and modulation distribution are satisfactory. Upon determining that the condition among the multiple conditions is not satisfactory, the processor can provide the condition to the RCA.

Computer System

Figure 7:
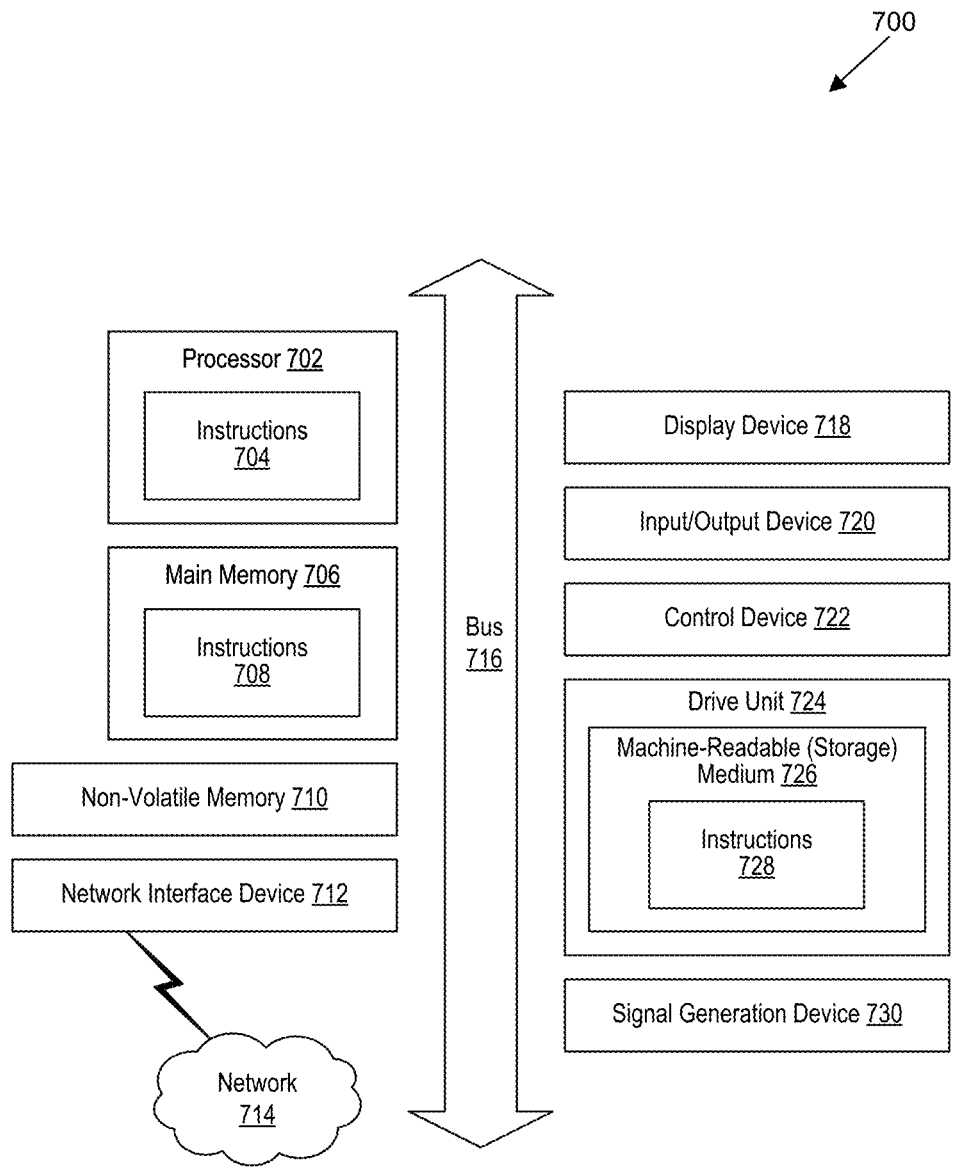
FIG. 7 is a block diagram that illustrates an example of a computer system in which at least some operations described herein can be implemented.

FIG. 7 is a block diagram that illustrates an example of a computer system 700 in which at least some operations described herein can be implemented. As shown, the computer system 700 can include: one or more processors 702, main memory 706, non-volatile memory 710, a network interface device 712, a video display device 718, an input/output device 720, a control device 722 (e.g., keyboard and pointing device), a drive unit 724 that includes a machine-readable (storage) medium 726, and a signal generation device 730 that are communicatively connected to a bus 716. The bus 716 represents one or more physical buses and/or point-to-point connections that are connected by appropriate bridges, adapters, or controllers. Various common components (e.g., cache memory) are omitted from FIG. 7 for brevity. Instead, the computer system 700 is intended to illustrate a hardware device on which components illustrated or described relative to the examples of the figures and any other components described in this specification can be implemented.

The computer system 700 can take any suitable physical form. For example, the computer system 700 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 700. In some implementations, the computer system 700 can be an embedded computer system, a system-on-chip (SOC), a single-board computer system (SBC), or a distributed system such as a mesh of computer systems, or can include one or more cloud components in one or more networks. Where appropriate, one or more computer systems 700 can perform operations in real time, in near real time, or in batch mode.

The network interface device 712 enables the computer system 700 to mediate data in a network 714 with an entity that is external to the computer system 700 through any communication protocol supported by the computer system 700 and the external entity. Examples of the network interface device 712 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 706, non-volatile memory 710, machine-readable medium 726) can be local, remote, or distributed. Although shown as a single medium, the machine-readable medium 726 can include multiple media (e.g., a centralized/distributed database and/or associated caches and servers) that store one or more sets of instructions 728. The machine-readable medium 726 can include any medium that is capable of storing, encoding, or carrying a set of instructions for execution by the computer system 700. The machine-readable medium 726 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 710, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 704, 708, 728) set at various times in various memory and storage devices in computing device(s). When read and executed by the processor 702, the instruction(s) cause the computer system 700 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. At least one non-transitory computer-readable storage medium storing instructions to determine a root cause of a failed interaction between a mobile device and a wireless telecommunication network, which, when executed by at least one data processor of a system, cause the system to:
    obtain data associated with the failed interaction between the mobile device and the wireless telecommunication network;
    determine whether a connection summary parameter is missing from the data associated with the failed interaction;
    upon determining that the connection summary parameter is missing, provide the connection summary parameter to a root cause analytics engine (RCA);
    upon determining whether the connection summary parameter is missing, determine whether signaling information is missing from the data associated with the failed interaction;
    upon determining that the signaling information is missing, provide the signaling information to the RCA;
    upon determining whether the signaling information is missing, determine whether a parameter is missing from the data associated with the failed interaction;
    upon determining that the parameter is missing, provide the parameter to the RCA;
    upon determining whether the parameter is missing, determine whether a node associated with the wireless telecommunication network is configured properly;
    upon determining that the node associated with the wireless telecommunication network is not configured properly, provide a configuration of the node to the RCA;
    upon determining whether the node is configured properly, determine whether a radio frequency (RF) measurement matches an expected RF measurement;
    upon determining that the RF measurement does not match the expected RF measurement, provide the RF measurement to the RCA;
    upon determining whether the RF measurement matches the expected RF measurement, determine whether a condition associated with a channel used in the failed interaction is satisfactory;
    upon determining that the condition associated with the channel used in the failed interaction is not satisfactory, provide the condition to the RCA; and
    cause the RCA to indicate a root cause associated with the failed interaction.

2. The at least one non-transitory computer-readable storage medium of claim 1, comprising instructions to:
    determine a type of the failed interaction based on multiple types including voice, short message service (SMS), throughput, access, and mobility;
    obtain multiple phases of an interaction,
        wherein the multiple phases include a LTE/NR registration, a default RF/power distribution unit establishment, an evolved packet system attach, a default Internet protocol (IP) multimedia subsystem bearer setup, and a session initiation protocol registration;
    based on the type of the failed interaction, determine a subset of the multiple phases relevant to the failed interaction;

based on the subset of the multiple phases relevant to the failed interaction, obtain a template representing a successful phase among the subset of the multiple phases; and based on the successful phase and the data associated with the failed interaction, determine an indication of the root cause of the failed interaction.

3. The at least one non-transitory computer-readable storage medium of claim 1, comprising instructions to:

obtain data associated with a successful interaction between the mobile device and the wireless telecommunication network;

store the data associated with the successful interaction in a database;

retrieve data associated with multiple successful interactions from the database over a predetermined period of time;

determine whether the data associated with the multiple successful interactions indicates a deterioration in interaction between the mobile device and the wireless telecommunication network; and upon determining that there is the deterioration, employ the RCA to determine a cause of the deterioration.

4. The at least one non-transitory computer-readable storage medium of claim 1, comprising instructions to:

obtain the data associated with the failed interaction between the mobile device and the wireless telecommunication network,
wherein the data associated with the failed interaction includes multiple component carriers;

determine whether the parameter is present in a component carrier; and upon determining that the parameter is not present in the component carrier among the multiple component carriers, send an indication to the RCA that the parameter is missing.

5. The at least one non-transitory computer-readable storage medium of claim 1, comprising instructions to:

obtain the data associated with the failed interaction between the mobile device and the wireless telecommunication network,
wherein the data associated with the failed interaction includes multiple RF measurements associated with multiple component carriers,
wherein the multiple RF measurements include an RF measurement at cell center, an RF measurement at cell middle, and an RF measurement at cell edge;

determine whether an RF measurement among the multiple RF measurements matches the expected RF measurement; and upon determining that the RF measurement among the multiple RF measurements does not match the expected RF measurement, provide the RF measurement to the RCA.

6. The at least one non-transitory computer-readable storage medium of claim 1, comprising instructions to:

obtain the data associated with the failed interaction between the mobile device and the wireless telecommunication network,
wherein the data associated with the failed interaction includes a block error rate, a physical resource block, a channel quality indicator, a modulation and coding scheme, and a modulation distribution;

determine whether multiple conditions associated with the channel used in the failed interaction are satisfied by:

determining whether the block error rate is satisfactory by determining whether the block error rate is under a first predetermined threshold;

determining whether the physical resource block is satisfactory;

determining whether the channel quality indicator is satisfactory;

determining whether the modulation and coding scheme is satisfactory;

determining whether the modulation distribution is satisfactory; and upon determining that the condition among the multiple conditions is not satisfactory, provide the condition to the RCA.

7. The at least one non-transitory computer-readable storage medium of claim 1, wherein the RCA includes an expert system or a machine learning model.

8. A method comprising:

obtaining data associated with a failed interaction between a UE and a wireless telecommunication network;

determining whether a connection summary parameter is missing from the data associated with the failed interaction;

upon determining that the connection summary parameter is missing, providing the connection summary parameter to an RCA;

upon determining whether the connection summary parameter among is missing, determining whether signaling information is missing from the data associated with the failed interaction;

upon determining that the signaling information is missing, providing the signaling information to the RCA;

upon determining whether the signaling information is missing, determining whether a parameter is missing from the data associated with the failed interaction;

upon determining that the parameter is missing, providing the parameter to the RCA;

upon determining whether the parameter is missing, determining whether a node associated with the wireless telecommunication network is configured properly;

upon determining that the node associated with the wireless telecommunication network is not configured properly, providing a configuration of the node to the RCA;

upon determining whether the node is configured properly, determining whether an RF measurement matches an expected RF measurement;

upon determining that the RF measurement does not match the expected RF measurement, providing the RF measurement to the RCA;

upon determining whether the RF measurement matches the expected RF measurement, determining whether a condition associated with a channel used in the failed interaction is satisfactory;

upon determining that the condition associated with the channel used in the failed interaction is not satisfactory, providing the condition to the RCA; and causing the RCA to indicate a root cause associated with the failed interaction.

9. The method of claim 8, comprising:

determining a type of the failed interaction based on multiple types including voice, SMS, throughput, access, and mobility;

obtaining multiple phases of an interaction, wherein the multiple phases include a 5G registration, a default power distribution unit establishment, an evolved packet system attach, a default IP multimedia subsystem bearer setup, and a session initiation protocol registration;

based on the type of the failed interaction, determining a subset of the multiple phases relevant to the failed interaction;

based on the subset of the multiple phases relevant to the failed interaction, obtaining a template representing a successful phase among the subset of the multiple phases; and based on the successful phase and the data associated with the failed interaction, determining an indication of the root cause of the failed interaction.

10. The method of claim 8, comprising:
obtaining data associated with a successful interaction between the UE and the wireless telecommunication network;
storing the data associated with the successful interaction in a database;
retrieving data associated with multiple successful interactions from the database over a predetermined period of time;
determining whether the data associated with the multiple successful interactions indicates a deterioration in interaction between the UE and the wireless telecommunication network; and
upon determining that there is the deterioration, employing the RCA to determine a cause of the deterioration.

11. The method of claim 8, comprising:
obtaining the data associated with the failed interaction between the UE and the wireless telecommunication network,
wherein the data associated with the failed interaction includes multiple component carriers;
determining whether a parameter is present in a component carrier among the multiple component carriers; and
upon determining that the parameter is not present in the component carrier among the multiple component carriers, sending an indication to the RCA that the parameter is missing.

12. The method of claim 8, comprising:
obtaining the data associated with the failed interaction between the UE and the wireless telecommunication network,
wherein the data associated with the failed interaction includes multiple RF measurements associated with multiple component carriers,
wherein the multiple RF measurements include an RF measurement at cell center, an RF measurement at cell middle, and an RF measurement at cell edge;
determining whether an RF measurement among the multiple RF measurements matches the expected RF measurement; and
upon determining that the RF measurement among the multiple RF measurements does not match the expected RF measurement, providing the RF measurement to the RCA.

13. The method of claim 8, comprising:
obtaining the data associated with the failed interaction between the UE and the wireless telecommunication network,
wherein the data associated with the failed interaction includes a block error rate, a physical resource block, a channel quality indicator, a modulation and coding scheme, and a modulation distribution;
determining whether multiple conditions associated with the channel used in the failed interaction are satisfied by:
determining whether the block error rate is satisfactory by determining whether the block error rate is under a first predetermined threshold;
determining whether the physical resource block is satisfactory;
determining whether the channel quality indicator is satisfactory;
determining whether the modulation and coding scheme is satisfactory;
determining whether the modulation distribution is satisfactory; and
upon determining that the condition among the multiple conditions is not satisfactory, providing the condition to the RCA.

14. A system comprising:
at least one hardware processor; and
at least one non-transitory memory storing instructions, which, when executed by the at least one hardware processor, cause the system to:
obtain data associated with a failed interaction between a UE and a wireless telecommunication network;
determine whether a connection summary parameter is missing from the data associated with the failed interaction;
upon determining that the connection summary parameter is missing, provide the connection summary parameter to an RCA;
upon determining whether the connection summary parameter is missing, determine whether signaling information is missing from the data associated with the failed interaction;
upon determining that the signaling information is missing, provide the signaling information to the RCA;
upon determining whether the signaling information is missing, determine whether a parameter is missing from the data associated with the failed interaction;
upon determining that the parameter is missing, provide the parameter to the RCA;
upon determining whether the parameter is missing, determine whether a node associated with the wireless telecommunication network is configured properly;
upon determining that the node associated with the wireless telecommunication network is not configured properly, provide a configuration of the node to the RCA;
upon determining whether the node is configured properly, determine whether an RF measurement matches an expected RF measurement;
upon determining that the RF measurement does not match the expected RF measurement, provide the RF measurement to the RCA;
upon determining whether the RF measurement matches the expected RF measurement, determine whether a condition associated with a channel used in the failed interaction is satisfactory;
upon determining that the condition associated with the channel used in the failed interaction is not satisfactory, provide the condition to the RCA; and
cause the RCA to indicate a root cause associated with the failed interaction.

15. The system of claim 14, comprising instructions to:
determine a type of the failed interaction based on multiple types including voice, SMS, throughput, access, and mobility;
obtain multiple phases of an interaction,
 wherein the multiple phases include a 5G registration, a default RF/power distribution unit establishment, an evolved packet system attach, a default IP multimedia subsystem bearer setup, and a session initiation protocol registration;
based on the type of the failed interaction, determine a subset of the multiple phases relevant to the failed interaction;
based on the subset of the multiple phases relevant to the failed interaction, obtain a template representing a successful phase among the subset of the multiple phases; and
based on the successful phase and the data associated with the failed interaction, determine an indication of the root cause of the failed interaction.

16. The system of claim 14, comprising instructions to:
obtain data associated with a successful interaction between the UE and the wireless telecommunication network;
store the data associated with the successful interaction in a database;
retrieve data associated with multiple successful interactions from the database over a predetermined period of time;
determine whether the data associated with the multiple successful interactions indicates a deterioration in interaction between the UE and the wireless telecommunication network; and
upon determining that there is the deterioration, employ the RCA to determine a cause of the deterioration.

17. The system of claim 14, comprising instructions to:
obtain the data associated with the failed interaction between the UE and the wireless telecommunication network,
 wherein the data associated with the failed interaction includes multiple component carriers;
determine whether a parameter present in a component carrier among the multiple component carriers; and
upon determining that the parameter is not present in the component carrier among the multiple component carriers, send an indication to the RCA that the parameter is missing.

18. The system of claim 14, comprising instructions to:
obtain the data associated with the failed interaction between the UE and the wireless telecommunication network,
 wherein the data associated with the failed interaction includes multiple RF measurements associated with multiple component carriers,
 wherein the multiple RF measurements include an RF measurement at cell center, an RF measurement at cell middle, and an RF measurement at cell edge;
determine whether an RF measurement among the multiple RF measurements matches the expected RF measurement; and
upon determining that the RF measurement among the multiple RF measurements does not match the expected RF measurement, provide the RF measurement to the RCA.

19. The system of claim 14, comprising instructions to:
obtain the data associated with the failed interaction between the UE and the wireless telecommunication network,
 wherein the data associated with the failed interaction includes a block error rate, a physical resource block, a channel quality indicator, a modulation and coding scheme, and a modulation distribution;
determine whether multiple conditions associated with the channel used in the failed interaction are satisfied by:
 determining whether the block error rate is satisfactory by determining whether the block error rate is under a first predetermined threshold;
 determining whether the physical resource block is satisfactory;
 determining whether the channel quality indicator is satisfactory;
 determining whether the modulation and coding scheme is satisfactory;
 determining whether the modulation distribution is satisfactory; and
upon determining that the condition among the multiple conditions is not satisfactory, provide the condition to the RCA.

20. The system of claim 14, wherein the RCA includes an expert system or a machine learning model.

* * * * *